Figure 1:
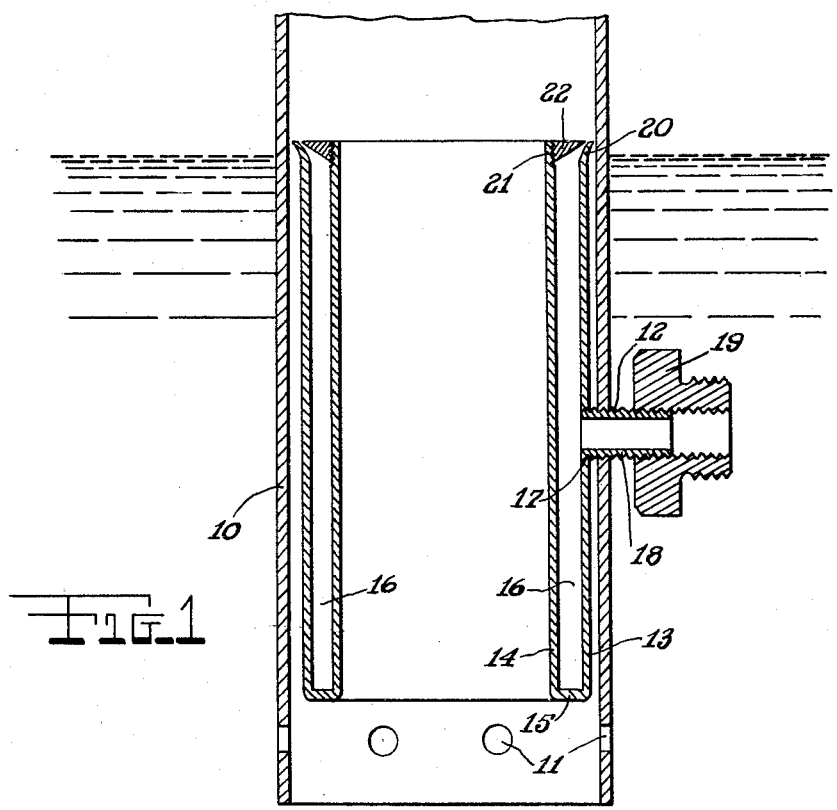

July 5, 1932. M. EIDSMORE 1,865,623

WATER EVACUATING DEVICE

Filed Dec. 17, 1931

INVENTOR
*M. Eidsmore*

BY HIS ATTORNEY *J. Ledermann*

Patented July 5, 1932

1,865,623

UNITED STATES PATENT OFFICE

MERTON EIDSMORE, OF ASTORIA, NEW YORK

WATER EVACUATING DEVICE

Application filed December 17, 1931. Serial No. 581,536.

The main object of this invention is the provision of a device for evacuating water from flooded places such as tunnels or excavations where water collects or seeps in, whereby the water may be evacuated with a minimum of labor and at a minimum of cost.

Another object of the invention is the provision of such a device operated by steam or compressed air, with means for varying the volume of inflow of the steam or air according to varying conditions under which the water is to be evacuated.

The above and other objects will become apparent in the description below, in which characters of reference refer to like-named parts in the drawing.

Referring briefly to the drawing, Figure 1 is a cross-sectional elevational view of the device mounted in a pipe into which the water is evacuated and by which it is carried off.

Figure 2:
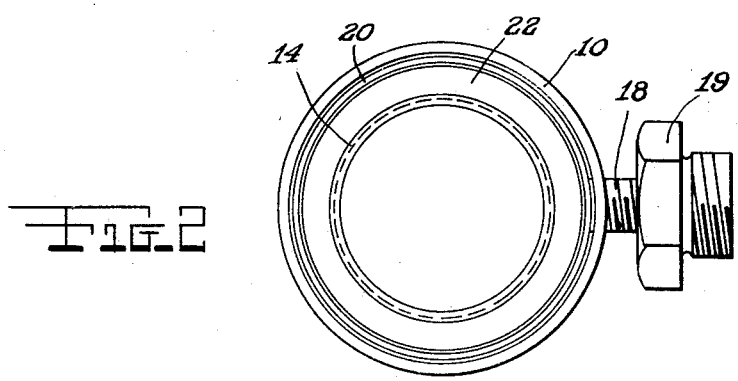

Figure 2 is a plan view of Figure 1.

Referring in detail to the drawing, the numeral 10 represents the pipe into which the device is inserted. This pipe 10 is stood upright in the pool of water, and in order to prevent sealing of the open lower end of the pipe by the floor of the pool, openings 11 are provided in the base of the pipe to enable the water to flow in. A hole 12 is also provided at a distance from the lower end, and this hole may be threaded; its purpose will be presently described. This pipe leads upward out of the place from which the water is to be removed.

The device proper consists of a double-walled pipe section, having the outer wall 13 and inner parallel wall 14, the lower ends of the latter being bridged to form a cylindrical compartment 16 sealed at the bottom by the base 15. The wall 13 has a threaded hole 17 at a distance from its lower end, into which a threaded hollow stem 18 is inserted, communicating with the chamber 16. This stem passes through the hole 12, and is adapted to be connected at its outer end to a pipe or hose conveying steam or compressed air thereinto. A nut 19 is shown, attached to the stem 18, and may be used as an aid in coupling the hose to the stem.

The upper periphery of the wall 13 is turned outward to provide a lip 20, and the upper edge of the wall 14 is threaded, at 21. An annular cap 22, triangular in cross-section and internally threaded, screws down on the threads 21 of the wall 14. Should this cap be entirely removed, the upper end of the chamber 16 will be wide open. By screwing the cap down to various positions, the degree of opening of this end of the chamber may be varied, as is obvious.

In use, the device may be mounted in the pipe 10 in an obvious manner, with the steam or air hose connected to the stem 18. The cap 22 has been positioned prior to insertion of the device into the pipe 10. Steam or compressed air enters the stem 18 and passes into the chamber 16. The air or steam will pass around this chamber and will finally form a steady stream upward out of the top of the chamber, into the pipe 10, always upward. The force of the air or steam passing upward will create a suction force in the lower end of the pipe, thus drawing water into the pipe through the central opening axially in the wall 14 and through the space between the wall 13 and pipe 10. The water thus drawn into the pipe 10 at the bottom will pass upward and out of the pipe.

Obvious modifications in form and structure may be made without departing from the spirit and scope of the invention.

I claim:

1. A device of the class described comprising, in combination with a pipe inserted into water, a cylindrical member having an outer cylindrical wall and an inner concentric cylindrical wall enclosing a compartment, said walls being joined at the bottom to seal the bottom of said compartment, an inlet in said outer wall permitting the entrance of steam, compressed air, or the like into said compartment, and means for varying the flow of said steam or air out of said compartment comprising an annular cap threadably engaging said inner wall and extending over the upper end of said compartment.

2. A device of the class described comprising, in combination with a pipe inserted into water, a member having an outer cylindrical wall and an inner cylindrical concentric wall enclosing a compartment therebetween, said walls being joined at the bottom to seal the bottom of said compartment, an inlet in said outer wall permitting the entrance of steam, compressed air, or the like into said compartment, and means for varying the flow of said steam or air out of said compartment.

3. A device of the class described comprising, in combination with a pipe inserted into water, a member having an outer cylindrical wall and an inner concentric wall enclosing a compartment therebetween, said walls being joined at the bottom to seal the bottom of said compartment, an inlet in said outer wall permitting the entrance of steam, compressed air, or the like into said compartment, and means for varying the flow of said steam or air out of said compartment comprising an outwardly extending lip on said outer wall, and an annular cap threadably engaging said inner wall and extending over the upper end of said compartment, said cap being substantially triangular in cross-section.

4. A device of the class described comprising, in combination with a pipe inserted into water, a member having an outer cylindrical wall and an inner cylindrical wall concentric with said outer wall, said walls enclosing a compartment therebetween and being joined at the bottom to seal said compartment, an inlet in said outer wall permitting the entrance of steam, compressed air, or the like into said compartment, and means for varying the flow of said steam or air out of said compartment comprising an outwardly extending lip on said outer wall, and an annular cap threadably engaging said inner wall and extending over the upper end of said compartment.

5. A device of the class described comprising, in combination with a pipe inserted into water, a member having an outer wall and an inner wall, said walls being substantially circular in cross-section and enclosing a compartment therebetween substantially circular in cross-section, said walls being joined at the bottom to seal the bottom of said compartment, an inlet in said outer wall permitting the entrance of steam, compressed air, or the like into said compartment, and means for varying the flow of said steam or air out of said compartment.

6. A device of the class described comprising, in combination with a pipe inserted into water, a member having an outer wall and an inner wall, said walls being substantially circular in cross-section and enclosing a compartment therebetween substantially circular in cross-section, said walls being joined at the bottom to seal the bottom of said compartment, an inlet in said outer wall permitting the entrance of steam, compressed air, or the like into said compartment, and means for varying the flow of said steam or air out of said compartment comprising an annular cap engaging one of said walls and extending over the top of said compartment, said cap being axially adjustable on said wall.

7. A device of the class described comprising, in combination with a pipe inserted into water, a member having an outer wall and an inner wall, said walls being substantially circular in cross-section and enclosing a compartment therebetween substantially circular in cross-section, said walls being joined at the bottom to seal the bottom of said compartment, an inlet in said outer wall permitting the entrance of steam, compressed air, or the like into said compartment, and means for varying the flow of said steam or air out of said compartment comprising an annular cap engaging one of said walls and extending over the top of said compartment, said cap being axially adjustable on said wall and having its lower edge bevelled.

In testimony whereof I affix my signature.

MERTON EIDSMORE.